March 28, 1933.  O. N. GREDELL  1,902,849
TRAILER TRUCK TANK CONSTRUCTION
Filed July 8, 1929  2 Sheets-Sheet 2
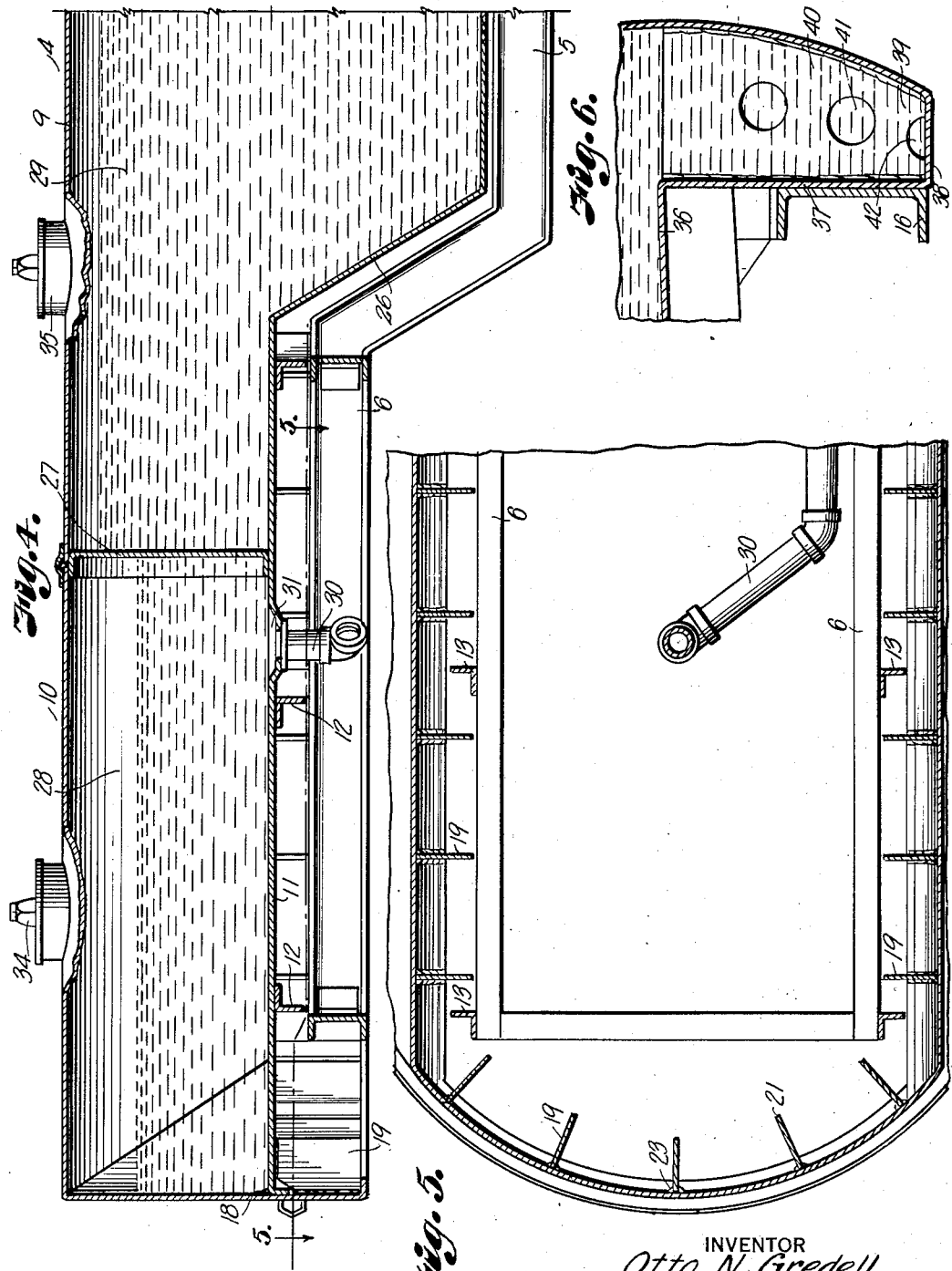
INVENTOR
Otto N. Gredell
BY Arthur C. Brown
ATTORNEY Patented Mar. 28, 1933

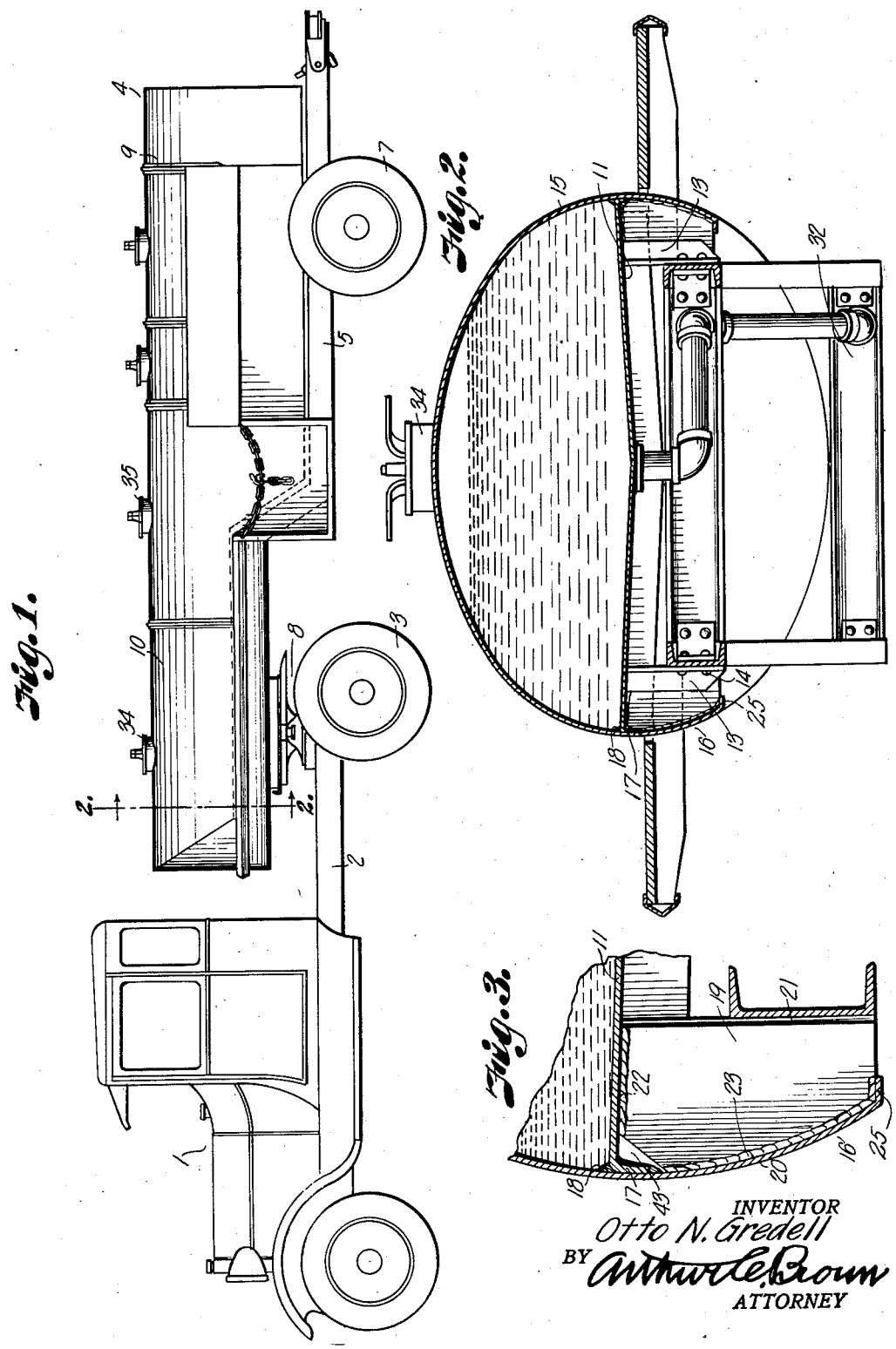

1,902,849

UNITED STATES PATENT OFFICE

OTTO N. GREDELL, OF KANSAS CITY, MISSOURI, ASSIGNOR TO STANDARD STEEL WORKS, OF NORTH KANSAS CITY, MISSOURI, A CORPORATION OF MISSOURI

TRAILER TRUCK TANK CONSTRUCTION

Application filed July 8, 1929. Serial No. 376,783.

My invention relates to tanks, and more particularly to trailer tanks for partial support by a traction vehicle, the principal objects of the invention being to lower the center of gravity of a trailer tank, and to support the front end of a trailing tank on the rear end of a truck chassis without unduly elevating the tank.

Further objects of my invention are to strengthen the front end of a tank having a vertical diameter reduced for mounting the same on a truck chassis, and to increase the liquid-carrying capacity of a tank having a portion of reduced diameter.

In accomplishing these and other objects of the invention, I have provided improved details of structure, the preferred forms of which are illustrated in the accompanying drawings, wherein:

Fig. 1 is a side elevation of a truck chassis and a trailer truck tank constructed in accordance with my invention and having its front end mounted on the chassis.

Fig. 2 is a section on the line 2—2, Fig. 1.

Fig. 3 is an enlarged fragmentary section of a lower edge of a reduced portion of the tank and a supporting sill, illustrating means for strengthening the tank.

Fig. 4 is a longitudinal central section of the front and a portion of the rear end of the trailer.

Fig. 5 is an enlarged fragmentary section on the line 5—5, Fig. 4.

Fig. 6 is a fragmentary section of the lower edge of the front end of a modified form of tank, illustrating the skirt portion as forming an additional container space.

Referring in detail to the drawings:

1 designates an automobile vehicle such as a truck chassis including a frame comprising longitudinal horizontal sills 2, and wheels 3.

4 designates a trailer truck comprising a frame including longitudinal channels or sills 5 having front portions 6 upwardly offset intermediately the ends of the sills, and wheels 7 adapted to support the rear portions of the sills substantially in alignment with the sills of the chassis 1.

The offset front portions of the trailer sills are adapted to rest on the chassis, and means such as an ordinary turntable device 8 is provided for supporting the front end of a tank 9 on the chassis.

The tank 9 is constructed of sheet metal conformably to the shape of the frame, and includes a front section 10 having less vertical diameter than the rear portion, the bottom 11 of the front section being upwardly offset from the bottom line of the rear portion so that it may rest on the offset front ends of the trailer sills.

The rear or normal section of the tank may be mounted in any approved fashion on the relatively low portion of the trailer frame.

The front elevated section of the tank is preferably supported by cross plates or angle bars 12 fixed to vertical angles 13 secured to the sills as by rivets 14 and extending upwardly therefrom.

The side walls 15 of the tank section 10 preferably extend downwardly and arcuately below the bottom to form wings or depending wall portions 16 and the bottom is provided with edge flanges 17 engaging the wings. The side walls may be secured to the bottom by any suitable means, including welds indicated at 18.

The front tank section projecting laterally beyond the sills, may then be stabilized in sill-supported position by gusset-like plates 19 having outer arcuate edges 20 engaging the inner surfaces of the depending wall portions, inner vertical edges 21 adjacent the sills, and upper horizontal edges 22 engaging the bottom of the tank section.

The edges may be welded to the bottom and wings 16 as indicated at 23.

The provision of depending wings 16 of the tank section 10 further promotes bracing and stabilizing of the section, since the depending flanges 17 may be formed on the edges of the bottom to engage the wings, and the welds 18 may be applied to the joint of the horizontal bottom plate with the side walls of the section, and built up in the recess formed by downbending of the bottom flanges, as clearly indicated in Fig. 3.

The lower edges of the depending wing-like portions 16 are provided with inwardly extending flanges 25 engaging the lower edges of the plates 19 and welded thereto, the wings 16 being thus more rigidly connected with the bottom of the tank section 10.

The tank may be divided into a plurality of compartments, and located preferably in front of the off-setting portion 26 of the bottom of the tank, is a transverse partition 27 forming a relatively small compartment 28 at the front end of the tank section 10, and a compartment 29 including a portion of the normal section of the tank.

A discharge conduit 30 is connected with a sump 31 formed in the bottom of the tank section 10 for draining liquid from the compartment 28. Means such as cross members 32 may be adapted for supporting the pipe including offset portions 33 of the conduit extending rearwardly along the trailer toward dispensing apparatus (not shown).

Inlets 34 and 35 are provided for introducing liquids to the several compartments.

In the modified form of tank section 10, illustrated in Fig. 6, the bottom 36 has a reduced width, and depending edge flanges 37 are extended downwardly to the level of the depending wings 16 of the side walls, the flanges and wings thus being spaced, and the inwardly extending flanges of the side wall wings are extended across the spacing to the flanges to form lower walls 38 or bottoms of chamber-like recesses or troughs 39 communicating with the tank section.

Gusset-like plates 40 similar to the plates 19 have their outer edges welded to the wings, inner vertical edges welded to the depending bottom flanges 37, and lower horizontal edges engaging the trough bottoms 38. The plates thus form partitions in the troughs, and are provided with intermediate openings 41 and lower edge openings 42 for movement of liquid therethrough.

The upper edges of the plates lie in the plane of the bottom 11, and the welding of the vertical edges of the plates to the flanges 37 and wings 16 thus effects a rigid connection between the bottom and the side walls.

Attention is recalled to the plates 19, which as illustrated in Fig. 3 may have cutaway portions forming apertures 43 for accommodating the plates to the depending bottom flanges 17 and to permit flow of fluid, for example gas or air past the plates.

The front end of the tank may be formed arcuately, as illustrated in Fig. 5, in which case the plates project inwardly toward the frame but do not engage sills.

The wings form a skirt depending from the tank section 10 around the lower edge thereof.

In apparatus constructed as described, the normal and relatively large section of the tank is supported at a relatively low elevation on the two-wheeled running gear of the trailer, while the reduced front end of the tank with its offset bottom is supported on the rear end of the traction vehicle, thus contrasting with ordinary practice in which a symmetrical elongated tank is supported with its rectilinear bottom elevated to the level of the support on the rear end of the traction vehicle, and the entire tank is unduly elevated.

In the construction shown, the top portion of the tank presents a symmetrical appearance, its top extending rectilinearly from the front end to the rear end.

The depending wings of the side walls of the reduced section improve the appearance of the tank, and also provide means for anchoring the side walls to the trailer frame through the plates 19. These plates further serve as brackets having inner vertical edges secured to the trailer frame sills, and upper portions engaged with the bottom of the tank section and with the wings.

The depending wings further enable the provision of additional container space, namely the troughs along the edges of the tank section.

When the modified form of skirt is employed to provide a depending hollow skirt or container portion, the partitions will be installed in such positions, for example rearwardly of the offset, as to permit drainage of liquid from the depending troughs into the rear section of the tank.

What I claim and desire to secure by Letters Patent is:

1. In a device of the character described, a frame including horizontal longitudinal sills having upwardly offset front portions, and a tank mounted on said frame including a reduced front end portion having depending edge flanges extending below said upwardly offset front portions of the sills to house said portions, and stabilizing means comprising plates fixed to said flanges.

2. In a device of the character described, a frame including horizontal longitudinal sills having upwardly offset front portions, and a tank mounted on said frame including a reduced front end portion having depending edge flanges, and means connecting said edge flanges with the frame.

3. In a device of the character described, a frame including horizontal longitudinal sills having upwardly offset front portions, and a tank mounted on said frame including a reduced front end portion having a bottom and downwardly extending side walls forming a depending skirt, and means including plates secured to said skirt and having edges fixed respectively to the frame and to the bottom for stabilizing the tank.

4. In a device of the character described, a frame including an upwardly offset front portion, and a tank mounted on said frame including an upwardly offset front end portion having a bottom and side walls extending arcuately below the bottom to form a depending skirt, said bottom having downwardly extending edge flanges, and means connecting the side wall flanges with the bottom.

5. In a device of the character described including a supporting frame, a tank on said frame including a portion projecting beyond the frame having a bottom wall and having a rounded side wall extended downwardly below the bottom to form a skirt, means for securing the tank to the frame, and a plate engaged with the bottom of the tank to brace said skirt.

6. In a device of the character described including parallel sills, a tank mounted on the sills and having a substantially flat bottom portion projecting outwardly from said sills, a skirt having an inbent lower end depending from the tank in spaced relation with said sills, and a plate engaging said bottom having an outer edge engaging said skirt and a lower edge engaging said inbent lower end thereof.

7. In a trailer of the character described, a frame including horizontal sills having upwardly offset front portions, a tank mounted on said frame having an upwardly offset front end portion supported on the offset front portions of the sills, and a skirt depending below the upwardly offset portion of the tank to enclose said upwardly offset portions of the sills.

8. In a trailer of the character described, a frame including horizontal sills having upwardly offset front portions, a tank of elliptical cross section mounted on said sills and having an upwardly offset portion supported on the offset front portions of the sills, and a skirt depending below the offset front portion and conforming to the shape of said elliptical section of the tank for enclosing said upwardly offset portions of the sills.

In testimony whereof I affix my signature.

OTTO N. GREDELL.